(12) United States Patent
DiGiampaolo et al.

(10) Patent No.: US 7,122,242 B2
(45) Date of Patent: Oct. 17, 2006

(54) WEDGE SHAPED GLASS AND METHODS OF FORMING WEDGED GLASS

(75) Inventors: Gerald DiGiampaolo, Allison Park, PA (US); James A. Zahler, Edinboro, PA (US); Jennifer M. Garefino, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 204 days.

(21) Appl. No.: 10/396,988

(22) Filed: Mar. 25, 2003

(65) Prior Publication Data

US 2003/0215610 A1  Nov. 20, 2003

Related U.S. Application Data

(60) Provisional application No. 60/370,592, filed on Apr. 5, 2002.

(51) Int. Cl.
*B23B 3/26* (2006.01)

(52) U.S. Cl. ............... 428/156; 428/157; 428/172; 428/192; 428/437; 428/220; 428/213; 428/215; 428/81; 65/61; 65/256; 65/255; 65/100; 65/101; 65/64; 65/93; 65/106; 65/102; 65/99.5; 359/720

(58) Field of Classification Search .......... 428/156, 428/157, 172, 192, 437, 220, 213, 215, 81; 65/61, 256, 255, 100, 101, 64, 93, 106, 102, 65/99.5; 359/720
See application file for complete search history.

(56) References Cited

U.S. PATENT DOCUMENTS

| | | |
|---|---|---|
| 710,357 A | 9/1902 | Heal |
| 789,911 A | 5/1905 | Hitchcock |
| 1,608,657 A * | 11/1926 | Howard ............... 65/100 |
| 1,668,576 A * | 5/1928 | Uhl ............... 65/61 |
| 3,083,551 A | 4/1963 | Pilkington ............... 65/32 |
| 3,215,516 A | 11/1965 | Pilkington ............... 65/94 |
| 3,220,816 A | 11/1965 | Pilkington ............... 65/99 |
| 3,554,722 A * | 1/1971 | Harvey et al. ............... 65/62 |
| 3,575,694 A | 4/1971 | Bigliardi et al. ............... 65/63 |
| 3,627,492 A | 12/1971 | Prislan ............... 65/91 |
| 3,695,859 A | 10/1972 | Dickerson et al. ............... 65/99 |
| 3,771,985 A | 11/1973 | Dickinson ............... 65/99 A |

(Continued)

FOREIGN PATENT DOCUMENTS

FR  1.573.894  7/1969

OTHER PUBLICATIONS

U.S. Appl. No. 60/370,592, filed Apr. 5, 2002.

*Primary Examiner*—William P. Watkins, III
(74) *Attorney, Agent, or Firm*—Andrew C. Siminerio

(57) ABSTRACT

A glass sheet includes a first edge, an opposing, second edge, and an intermediate location between the first edge and second edge. The glass sheet has a first portion extending between the first edge and the intermediate location and a second portion extending between the intermediate portion and the second edge, wherein the first portion has a generally uniform thickness and the second portion has a varying thickness. The thickness of the second portion can either increase or decrease from the intermediate location to the second edge. A laminated transparency incorporating the glass sheet as well as a method of forming a glass ribbon having a changing thickness profile along at least a portion of the width of the ribbon are also disclosed.

20 Claims, 4 Drawing Sheets

U.S. PATENT DOCUMENTS

| | | | |
|---|---|---|---|
| 3,843,346 A | 10/1974 | Edge et al. | 65/65 A |
| 3,871,854 A | 3/1975 | Milnes | 65/65 A |
| 3,929,444 A | 12/1975 | May et al. | 65/99 A |
| 4,354,866 A | 10/1982 | Mouly | 65/99.5 |
| 4,828,900 A * | 5/1989 | Mouly | 428/192 |
| 5,812,332 A | 9/1998 | Freeman | 359/894 |
| 6,004,655 A * | 12/1999 | Tanaka et al. | 428/192 |
| 6,414,796 B1 * | 7/2002 | Muromachi et al. | 359/630 |
| 2002/0064626 A1 * | 5/2002 | Shukuri et al. | 428/156 |

\* cited by examiner

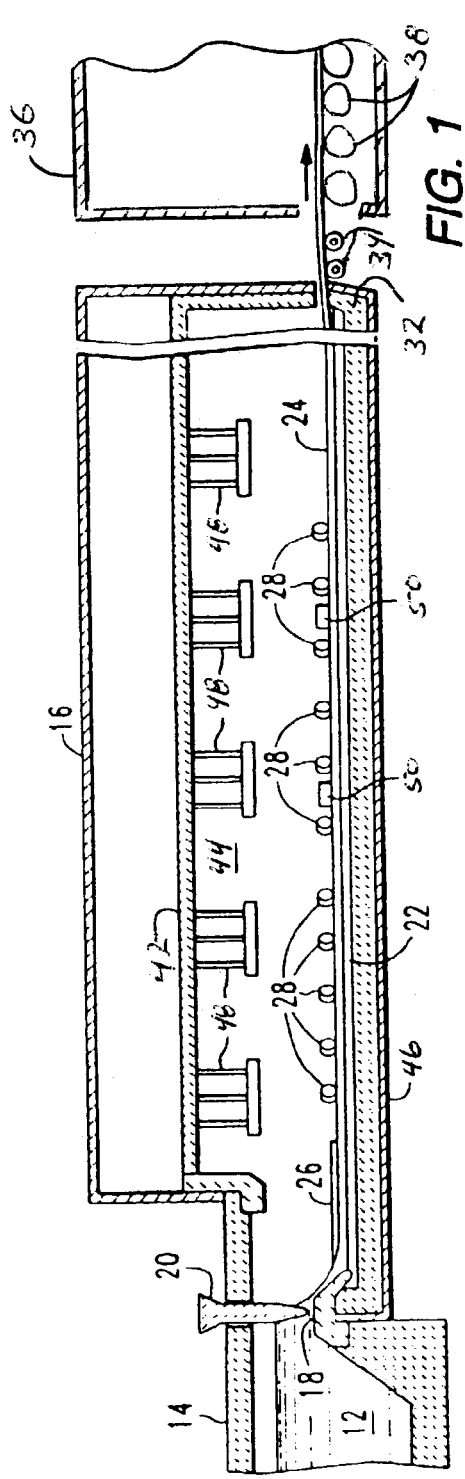

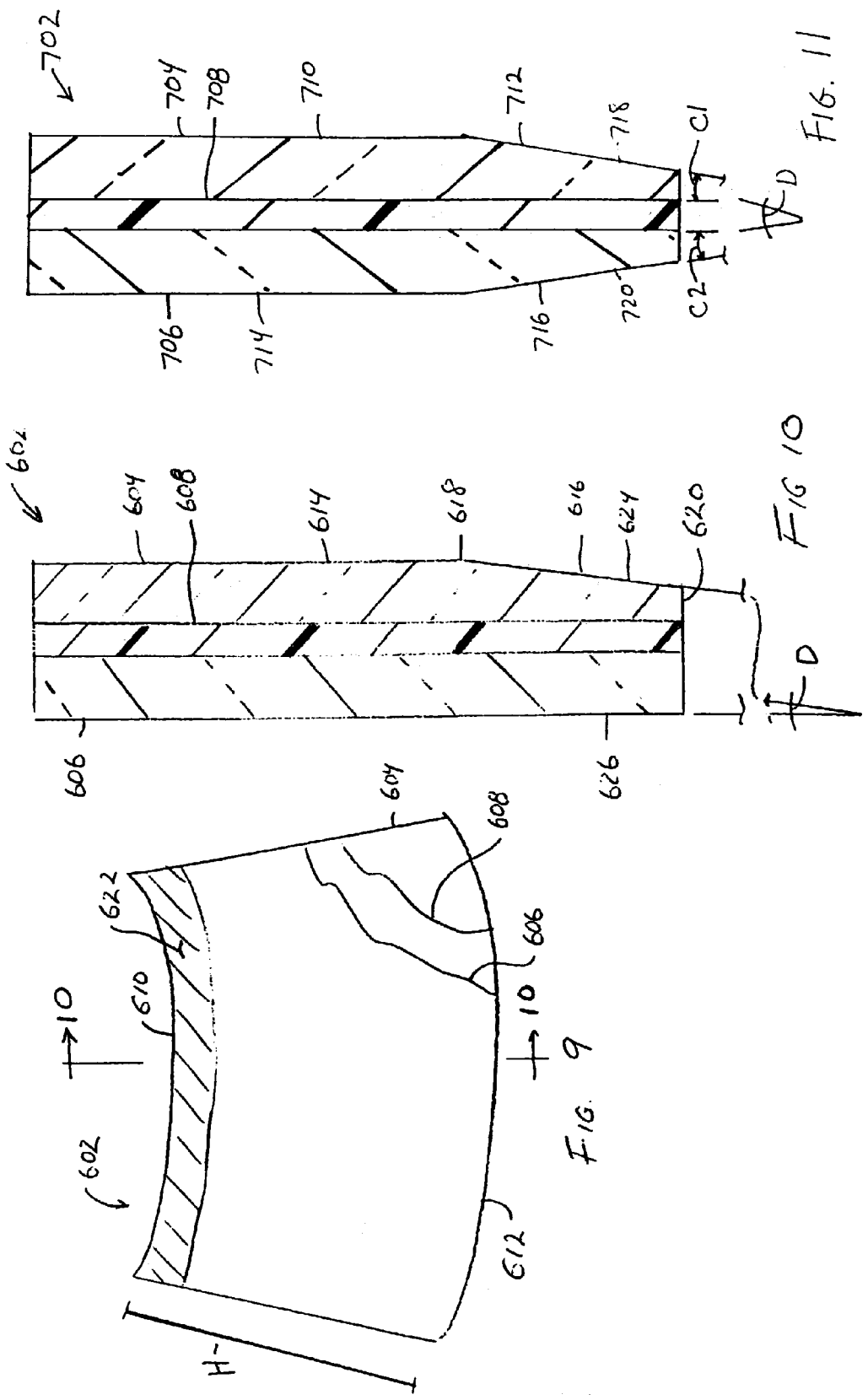

WEDGE SHAPED GLASS AND METHODS OF FORMING WEDGED GLASS

CROSS-REFERENCE TO RELATED APPLICATION

This application claims the benefits of U.S. Provisional Application Ser. No. 60/370,592 filed Apr. 5, 2002, which is herein incorporated by reference in its entirety.

This invention relates to a method of manufacturing glass on the surface of a pool of molten tin using the manufacturing process commonly referred to as the float glass process in a manner such that at least a portion of the glass has a varying thickness profile, and a laminate incorporating the glass. More particularly, the invention relates to a process for forming a glass sheet wherein at least a portion of the glass sheet has a wedge shaped thickness profile. The present invention also relates to a glass sheet wherein at least a portion of the glass sheet has a wedge shaped thickness profile. As used herein, the term "wedge" means that the thickness of the glass sheet tapers from a first thickness to a second thickness that is different from the first thickness.

In forming flat glass using the process known as the "float process", which is well known in the art, molten glass is delivered onto a pool of molten metal in a float forming chamber and attenuated to form a ribbon of desired thickness. Glass entering the float forming chamber is initially at a relatively high temperature, for example around 2000° F. (1100° C.), so as to be relatively fluid. During its passage through the float chamber, the glass is cooled to a condition suitable for engagement with attenuating devices, for example to a temperature around 1400–1700° F. (760–930° C.), and subsequently cooled further to a dimensionally stable condition so that it can be withdrawn from the forming chamber, typically to a temperature about 1100° F. (600° C.). The molten metal, usually molten tin or an alloy thereof, and the atmosphere within the forming chamber are generally at a temperature lower than the glass temperature and thus considerable cooling of the glass takes place naturally by losing heat to the surroundings in the forming chamber. Various nonlimiting types of float glass systems are disclosed in U.S. Pat. Nos. 710,357; 789,911; 3,083,551; 3,220,816 and 3,843,346, which patents are hereby incorporated by reference. Various nonlimiting types of glass ribbon attenuation arrangements used to produce glass of a desired thickness are disclosed in U.S. Pat. Nos. 3,215,516; 3,695,859; 3,843,346 and 4,354,866, which patents are hereby incorporated by reference. The defects associated with stretching the molten glass are disclosed in U.S. Pat. No. 4,354,866, which patent is hereby incorporated by reference.

In the production of float glass, the glass is formed to provide a generally uniform thickness profile across the width of the glass. In certain glass applications it would be advantageous to provide a glass sheet wherein at least a portion of the glass sheet has a varying thickness profile, and in particular a wedge shaped profile. For example, automotive windshields used in a heads-up display system typically produce a double, or ghost, image when a display is projected onto and reflected from the windshield as discussed in U.S. Pat. No. 5,812,332, which patent is hereby incorporated by reference. One method of avoiding such a double image is to provide a windshield configuration wherein the image reflected off the outer surface of the windshield is superimposed over the image reflected off the inner surface of the windshield. This can be accomplished by providing an angular offset between the opposing surfaces of the windshield at least in the area where the display is projected onto and reflected from the windshield surface. One way of providing such a windshield is to incorporate at least one a glass sheet having a wedge shaped thickness profile into the windshield construction.

It would be advantageous to have a glass sheet wherein at least a portion of the glass has a wedge shaped thickness profile and further to develop a process to produce such a glass sheet.

The present invention provides a glass sheet comprising a first edge, an opposing, second edge, and an intermediate location between the first edge and second edge. The glass sheet has a first portion extending between the first edge and the intermediate location and a second portion extending between the intermediate portion and the second edge, wherein the first portion has a generally uniform thickness and the second portion has a varying thickness. In one nonlimiting embodiment of the invention, the thickness of the second portion increases from the intermediate location to the second edge, while in another nonlimiting embodiment, the thickness of the second portion decreases from the intermediate location to the second edge.

The present invention also provides a laminated transparency, comprising a first glass ply, a second glass ply, and an interlayer material securing the first glass ply to the second glass ply. The first glass ply has a first edge, an opposing second edge, and an intermediate location between the first edge and second edge, wherein the first glass ply has a first portion extending between the first edge and the intermediate location and a second portion extending between the intermediate portion and the second edge. The first portion has a generally uniform thickness and the second portion has a thickness that decreases from the intermediate location to the second edge of the first glass ply. In one nonlimiting embodiment, the laminate is an automotive windshield and at least a portion of the interlayer material includes a wedge shaped thickness profile.

The present invention further provides a method of forming a glass ribbon having a changing thickness profile along at least a portion of the width of the ribbon, comprising (i) delivering a stream of molten glass to a pool of molten metal within a longitudinally extending forming chamber; (ii) applying an attenuating force to the glass to draw the glass through the forming chamber at a downstream velocity that is generally uniform across the glass to form a ribbon comprising a center portion and a longitudinal edge portion extending between the center portion and a longitudinal edge of the ribbon; and (iii) changing the downstream velocity of selected portions of the ribbon so as to change the attenuation of the ribbon such that the center portion of the ribbon has a generally uniform thickness profile across the width of the ribbon and the longitudinal edge portion has a varying thickness profile across the width of the ribbon with a first thickness along the center portion that generally corresponds to the uniform thickness of the central portion and a second thickness along the longitudinally edge of the ribbon different from the first thickness. In one nonlimiting embodiment of the invention, opposing longitudinally extending edges of the ribbon are engaged with a tractive force to change the amount of glass attenuation along the longitudinal edge portions. In other nonlimiting embodiments, the engaging comprises contacting an upper surface of the ribbon with a rotating roll of an edge roll machine and either increasing the rotational speed of the roll to decrease the attenuation of the longitudinal edge portion as it is drawn through the forming station so that the different thickness of the ribbon along the longitudinal edge is greater than the uniform thickness, or decreasing the rotational speed of the roll to increase the attenuation of the longitudinal edge portion as it is drawn through the forming station so that the different thickness of the ribbon along the longitudinal edge is less than the uniform thickness. In still another nonlimiting embodiment, the downstream velocity is changed by changing the viscosity of selected portions of the ribbon.

FIG. 1 is a schematic cross-sectional side view of a glass forming chamber of a float glass forming system.

FIG. 2 is a schematic plan view of the glass forming chamber of FIG. 1.

FIG. 9 is plan view of a windshield incorporating features of the present invention.

FIG. 10 is a cross-sectional view taken along line 10—10 of FIG. 9.

FIG. 11 is a cross-sectional view of an alternate windshield embodiment incorporating features of the present invention.

Figure 3:
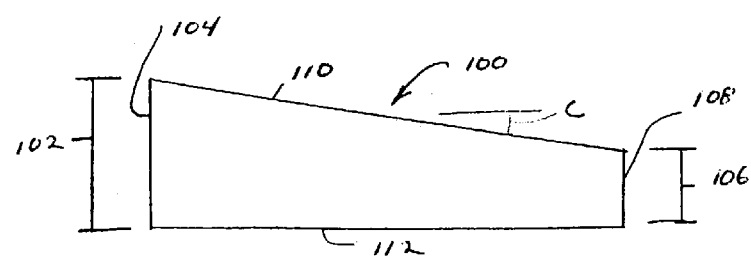
FIGS. 3 through 5 are cross-sectional thickness profiles of glass sheets having a thickness profile of the present invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 7.2, or 2.5 to 8.7 or 5.5 to 10. Additionally, any reference referred to as being "incorporated herein" is to be understood as being incorporated in its entirety.

FIGS. 1 and 2 illustrate the one embodiment of a float glass forming systems that is in wide commercial use today. Details of its construction and operation will be familiar to those of skill in the art. However, it should be understood that other types of forming chamber structures can be employed with the present invention In the arrangement shown in FIGS. 1 and 2, molten glass 12 contained in a melting furnace 14 is metered into a float forming chamber 16 between a lip 18 and a vertically adjustable tweel 20, e.g. as disclosed in U.S. Pat. No. 4,354,866, which patent is hereby incorporated by reference. Within the forming chamber 16, the molten glass is supported by a pool of molten metal 22, usually tin, and forms a glass ribbon 24 between side barriers 26. Edge roll machines 28 are positioned along a portion of the forming chamber 16 to locally engage the ribbon slightly inboard of the longitudinally extending edges 30 of the ribbon 24 and provide a tractive force to the ribbon 24 to draw the ribbon through the forming station and assist in establishing a desired ribbon thickness and width, while maintaining the ribbon position within the forming chamber 16, as discussed below in more detail. As the ribbon 24 proceeds beyond the last machine 28, its width can decrease slightly due to the continued attenuation of the glass. The ribbon 24 is then withdrawn from the forming chamber 16 through an exit opening 32, where it is lifted from the molten metal 22 by lift-out rolls 34, and enters an annealing lehr 36 to controllably cool the glass. Lehr rolls 38 support the ribbon 24 as it moves through the lehr 36. Engagement of the ribbon 24 by rolls 38 is the principal attenuating force that stretches the ribbon 24 within the forming chamber 16 and establishes the ribbon thickness.

The edge roll machines 28, which are also referred to as Assisted Direct Stretch (ADS) machines, can be of any design, e.g. the design shown in U.S. Pat. No. 3,929,444, which patent is incorporated by reference. The speed of the edge roll machines 28 is adjusted so as to establish a uniform ribbon velocity across the width of the ribbon 24 so that there will be uniform attenuation of the ribbon and thus a uniform thickness across the ribbon width. More specifically and without limiting the present invention, in the particular nonlimiting embodiment of the invention shown in FIGS. 1 and 2, pairs of edge roll machines are positioned along opposite sides of the ribbon 24. Rolls 40 of the edge roll machines engage the top surface of the ribbon slightly inboard of the ribbon's edges 30, and the speed of rotation of each roll 40 is controlled to establish a uniform thickness profile across the width of the ribbon as it passes through forming chamber 16. If desired, rolls of machines 28 can be angled outwardly slightly relative to the direction of glass travel. It should be appreciated that the rotational speed of the rolls of each edge roll machine is less than the downstream speed of the ribbon at the point where the rolls contact the ribbon. As used herein, the term "downstream" means in a direction from the melting furnace 14 towards lehr 36.

The forming chamber 16 includes a roof 42, side walls 44 and refractory basin 46 of conventional construction well known in the art. Electrical resistance heating elements 48 are positioned along roof 42 of the forming chamber 16. The side walls 44 are spaced above the basin 46 to provide an access opening, which is plugged by side seals (not shown). The edge roll machines 28 and conventional edge coolers 50 are inserted through side seals into the forming chamber 16. The molten metal 22 is contained within the refractory basin 46.

Another embodiment of a float glass forming system that is widely used today is similar to that discussed above; however rather then depositing the molten glass onto the molten metal between side barriers to form the glass ribbon, the molten glass is permitted to flow outward and in one nonlimiting embodiment form a bulging or bulbous-like shape. The edge roll machines 28 are positioned along a portion of the forming chamber 16 to assist in establishing a desired ribbon width. The ribbon thereafter proceeds through the forming chamber as discussed above. This type of glass forming technology is well know in the art and is disclosed for example, in U.S. Pat. Nos. 3,771,985 and 3,871,854, which are hereby incorporated by reference.

Figure 4:
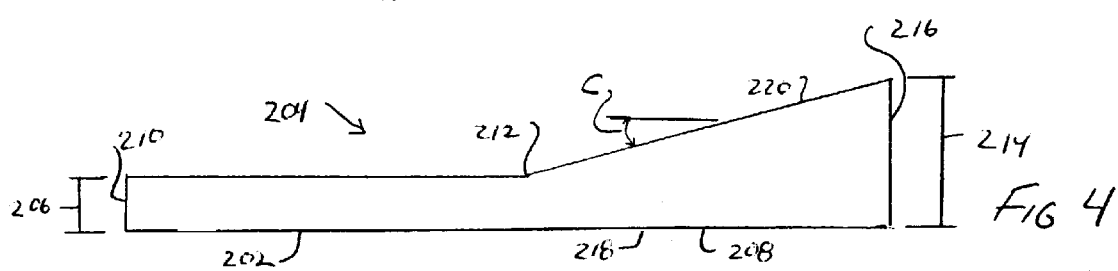
Figure 5:
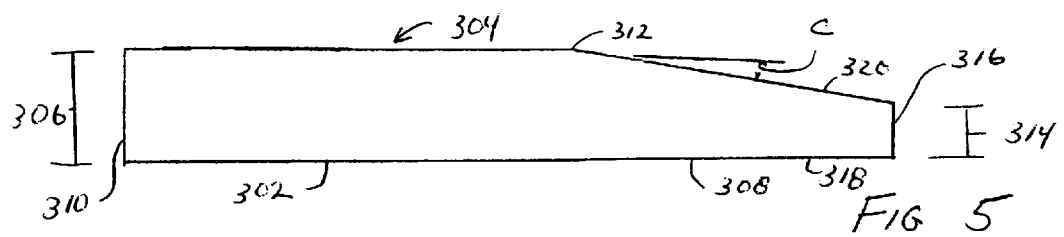
Figure 7:
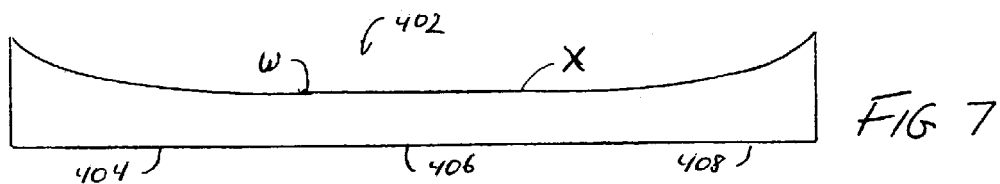
FIG. 7 is a schematic cross-sectional view representative of the thickness profile of the glass ribbon shown in FIG. 6.
Figure 8:
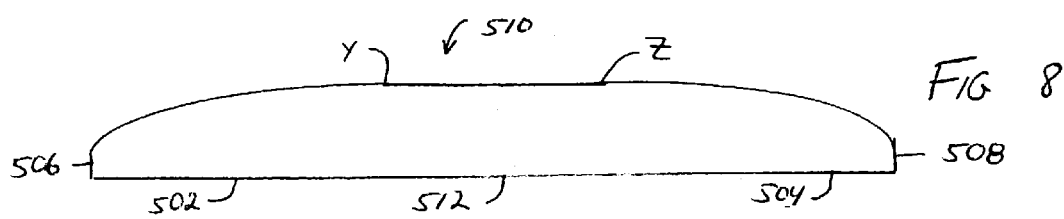
FIG. 8 is a schematic cross-sectional view representative OF an alternate glass ribbon thickness profile of the present invention.

In the present invention, the float glass forming process is modified to provide a glass ribbon having portions with a varying cross sectional thickness. FIGS. 3 through 5 illustrate several different glass sheet cross sectional profiles made according to the present invention. In FIG. 3, glass sheet 100 has a first thickness 102 along one longitudinal edge 104 and a second thickness 106, less than the first thickness 102, along an opposing longitudinal edge 108. The change in the thickness from first thickness 102 to the second thickness 106 can be nonuniform, i.e. nonlinear for example as shown in FIGS. 7 and 8 which will be discussed later in more detail, or uniform, i.e. linear for example as shown in FIG. 3, wherein the glass thickness changes at a constant rate over the width of the glass sheet 100 so that the glass surfaces are generally flat. In FIG. 4, a first portion 202 of the glass sheet 204 has a generally uniform thickness 206 and a second portion 208 has a wedge shaped thickness profile that increases in thickness. More particularly, first portion 202 has a constant thickness 206 between longitudinal edge 210 and interface 212, and second portion 208 has a thickness that increases from the thickness 206 of the first portion 202 at interface 212 to a greater thickness 214 along longitudinal edge 216 of the glass sheet 204. The location of interface 212 where the glass sheet transitions between thickness 206 and thickness 214 can be anywhere between opposing longitudinal edges 210 and 216. In FIG. 5, a first portion 302 of glass sheet 304 has a generally uniform thickness 306 while a second portion 308 has a wedge shaped profile that decreases in thickness. More particularly, first portion 302 has a constant thickness 306 between longitudinal edge 310 and interface 312, and second portion 308 has a thickness that decreases from the thickness 306 of the first portion 302 at interface 312 to a lesser thickness 314 along longitudinal edge 316 of the glass sheet 304. The location of interface 312 where the glass sheet transitions between thickness 306 and thickness 314 can be anywhere between opposing longitudinal edges 310 and 316. It would be appreciated that the change in the thickness of second portions 208 and 308 in FIGS. 4 and 5, respectively, can be uniform or nonuniform over the second portion, as discussed in FIG. 3.

The angular difference between the opposing surfaces of the sheet is referred to herein as the wedge angle C. More specifically and referred to FIG. 3, wedge angle C is the angular difference between surfaces 110 and 112 of sheet 100. Referring to FIG. 4, wedge angle C is the angular difference between surface 218 and surface 220 of portion 208. Referring to FIG. 5, wedge angle C is the angular difference between surface 318 and surface 320 of portion 308. It should be appreciated that in these particular non-limiting embodiments, the thickness of the second portion changes in a generally uniform manner so that the wedge angle C remains generally constant. In these nonlimiting embodiments, wedge angle C is determined by the total difference in the thickness between the opposing one edges of the wedged portion and the width of the wedged portion. It is apparent that along the first portion of the glass sheets where the thickness is uniform, the wedge angle C is 0° because the opposing surfaces are substantially parallel to each other.

The wedge shaped glass cross sectional profile as discussed above and shown in FIGS. 3 and 4 can be produced by changing the speed at which edge roll machines 28 advance the ribbon 24 through the forming chamber 16 of the float glass forming system, i.e. changing the rotational speed of the edge roll machines 28. More particularly, it has been found that by increasing the rotational speed of the rolls 40 of the edge roll machines 28, the speed at which longitudinal edge portions 52 of the ribbon 24 advance through the forming chamber 16 increases, so that the difference between the downstream velocity of the ribbon 24 along its longitudinal edge portions 52 and the velocity at which the ribbon 24 exits the forming chamber 16 and enters the lehr 36 decreases. This reduced velocity differential causes the ribbon in the longitudinal edge portions 52 to attenuate less in this localized area as compared to the center portion 54 of the ribbon 24. As a result, the ribbon in the area of the reduced attenuation will have a greater thickness. The amount of reduction in ribbon attenuation and the accompanying increase in glass ribbon thickness will be a function of this velocity differential, i.e. the less the velocity differential, the less the ribbon attenuation and the thicker the localized area of the ribbon. As one moves from edge 30, through the edge portion 52 toward the center portion 54 of the ribbon 24, the effect that the change in roll speed has on changing ribbon attenuation as compared to the center portion of the ribbon diminishes. More specifically, the velocity differential increases and ribbon attenuation increases until it is the same as the center portion of the ribbon. The reduced attenuation along the edge of the ribbon and the gradual increase in attenuation as one moves toward the center of the ribbon results in generally wedge shaped thickness profile in the longitudinal edge portions 52, with the edges 30 having the greatest thickness and the thickness decreasing through the longitudinal edge portions 52 to the uniform thickness of the center portion 54. As should be apparent, the width of the wedge shaped, longitudinal edge portions 52 will depend on several factors, including but not limited to, the final thickness of the center portion 54 of the ribbon 24 and the increase in the roll speed of the edge machines 28.

In a first trail (Trial 1) to produce a ribbon with a varying thickness profile across selected portions of its width, a float ribbon was formed using the alternate float process discussed above and shown in U.S. Pat. No. 3,771,985. Prior to testing, the ribbon thickness was 0.091 inches (2.3 mm), ribbon width as the glass left the forming chamber and entered the annealing lehr was 135 inches (3.34 meters), the tonnage rate was 450 tons per day (TPD) and the ribbon speed into the annealing lehr was speed of 548 inches per minute (13.92 meters per minute). Two sets of seven edge roll machines were spaced along opposing 50 foot sections of the forming chamber and angled at an angle of 15° measured perpendicular to the chamber. The rotational speed of the edge roll machines, i.e. the rolls engaging the ribbon surface, was increased as shown in Table 1 to gradually increase the edge velocity (and reduce the velocity differential) of the longitudinal edge portions 52 of the ribbon 24. The edge roll machines are shown in Table 1 in their downstream order, i.e. from left to right as viewed in FIGS. 1 and 2.

TABLE 1

| Original Speed (IPM) | Final Speed (IPM) |
|---|---|
| 111 | 120 |
| 113 | 140 |
| 123 | 180 |
| 146 | 205 |
| 195 | 240 |

TABLE 1-continued

| Original Speed (IPM) | Final Speed (IPM) |
| --- | --- |
| 254 | 279 |
| 323 | 340 |

Figure 6:
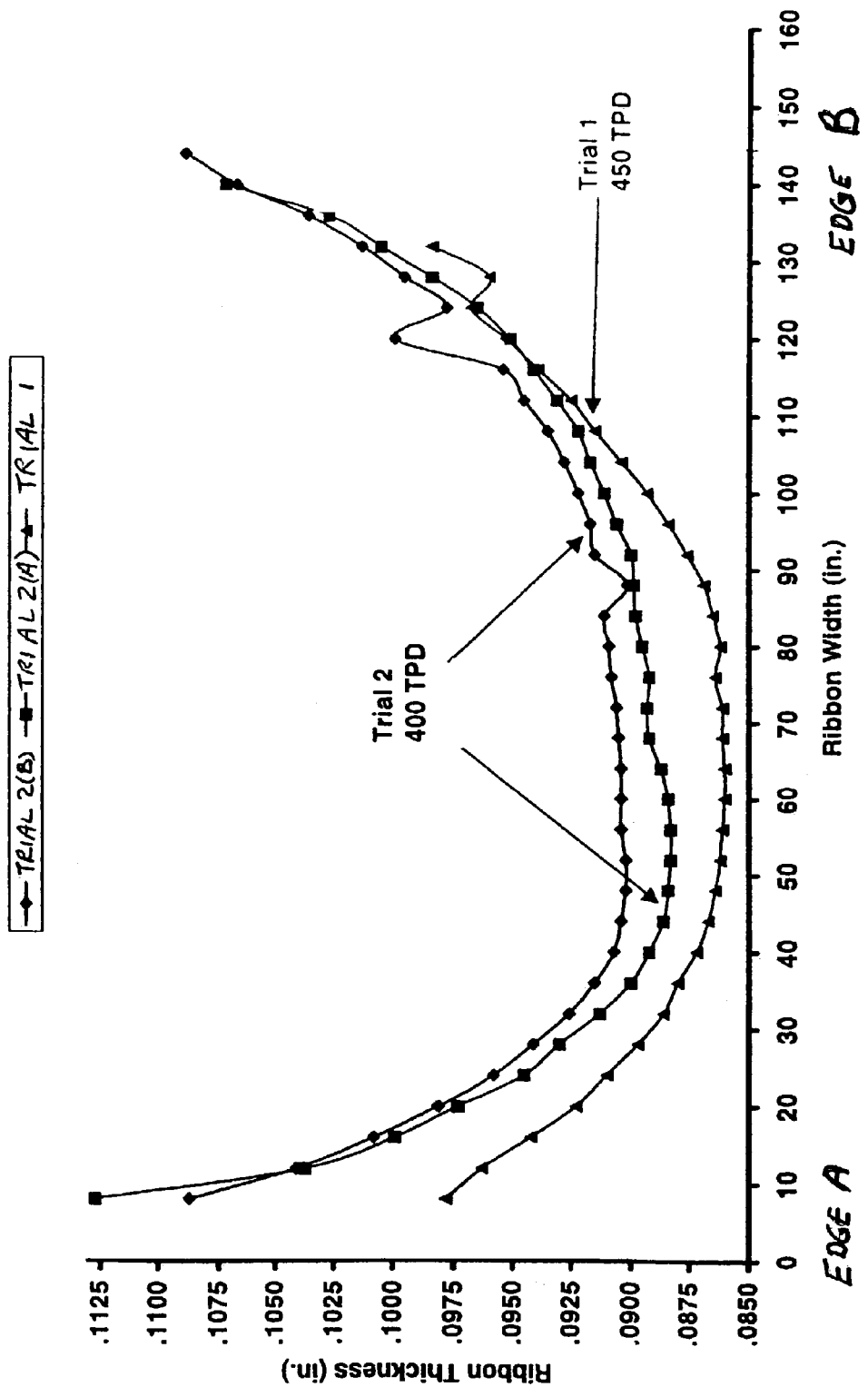
FIG. 6 is a plot of the thickness profiles of a glass ribbon produced during testing.

By the end of the trial, the tonnage rate was again 450 TPD and the ribbon width was 135 inches, although the ribbon width varied during the trial. The final ribbon speed was 540 inches per minute. In addition, the resulting glass ribbon had wedge shaped portions along its longitudinally extending edges. More specifically, FIG. 6 shows the thickness profile realized in Trial 1 six hours after the change in machine head speeds. As can be seen, the thickness of the glass ribbon along the longitudinal edge portions was increased by the edge roll machine and the thickness decreased from its outer edges (edges A and B in FIG. 6), through the longitudinal edge portions, towards its central region. In particular, the glass ribbon thickness decreased from approximately 0.098 inches (2.49 mm) to approximately 0.0865 inches (2.20 mm) over the outer 40–44 inches (101.6–111.8 cm) of the glass ribbon. The thickness of the central portion of the glass ribbon remained relatively constant. These outer wedge shaped portions of glass ribbon had a wedge angle C ranging from 0.0150 degrees to 0.0165 degrees (0.26 to 0.29 milliradians).

In a second trial (Trial 2) to produce a ribbon with a varying thickness profile across selected portion of its width using the alternate float process discussed above and shown in U.S. Pat. No. 3,771,985, the initial ribbon thickness was 0.091 inches (2.3 mm), the initial ribbon width as the glass left the forming chamber and entered the annealing lehr was 152 inches (3.86 meters), the initial tonnage rate was 400 tons per day and the initial ribbon speed into the annealing lehr was speed of 450 inches per minute (11.43 meters per minute). The edge roll machines were set-up in the same manner as discussed above in Trial 1 and the rotational speed of the ribbon engaging rolls of the edge roll machines was increased as shown in Table 2 to gradually increase the downstream velocity (and reduce the velocity differential) of the longitudinal edge portions 52 of the ribbon 24. The edge roll machines are presented in Table 2 in their downstream order, i.e. from left to right as viewed in FIGS. 1 and 2.

TABLE 2

| Original Speed (inches per minute) | Final Speed (inches per minute) |
| --- | --- |
| 93 | 125 |
| 101 | 176 |
| 109 | 270 |
| 127 | 300 |
| 160 | 310 |
| 205 | 315 |
| 256 | 360 |

By the end of Trial 2, the tonnage rate was still 400 TPD, the ribbon speed remained 450 inches per minute (11.43 meters per minute) and the ribbon width remained at 152 inches (3.86 meters). As in Trial 1, the resulting glass ribbon had wedge shaped portions along its longitudinally extending edges. More specifically, FIG. 6 shows two thickness profiles realized from Trial 2. The first profile was taken 4 hours after the edge roll machine speeds were changed and the second profile was taken 6 hours after the edge roll machine speeds were changed. The thickness profiles shown in FIG. 6 are designated as Trial 2(A) and Trial 2(B), respectively. As can be seen, the thickness of the ribbon along the longitudinal edge portions was increased by the edge roll machine and the thickness decreased from its outer edge, through the longitudinal edge portions, toward the center. In particular, in each thickness profile, the wedge shaped edge portions extended approximately 35–40 inches (88.9 to 101.6 cm) in from one longitudinal edge (edge A as shown in FIG. 6) and approximately 55–60 inches (139.7 to 152.4 cm) inward from the opposing edge (edge B as shown in FIG. 6). The glass thickness changed as shown in Table 3:

TABLE 3

| | Change in Ribbon Thickness (inches) | |
| --- | --- | --- |
| | Trial 2(A) | Trial 2(B) |
| Edge A | from 0.1125 to 0.0885 | from 0.1087 to 0.0902 |
| Edge B | from 0.1070 to 0.0900 | from 0.1087 to 0.0910 |

This change in ribbon thickness equates to a wedge angle C along the surface of the ribbon extending inward from edge A ranging from 0.0265° to 0.0393° (0.46 to 0.69 milliradians), and a wedge angle C along the surface of the ribbon extending inward from edge B ranging from 0.0162° to 0.0184° (0.28 to 0.32 milliradians).

FIG. 7 schematically represents the glass profiles shown in FIG. 6. It is noted that thickness of the glass in the wedge shaped portions of the ribbon did not change linearly but rather varied in a different manner. With continued attention to FIG. 7, it can be seen that by cutting ribbon 402 at point W, i.e. where wedge portion 404 meets uniform thickness center section 406 of the ribbon, the profile of the two resulting glass pieces would generally be that as shown in FIGS. 3 and 4. If the glass ribbon 402 is cut at points W and X, wherein point X is where wedge portion 408 meets uniform thickness center section 406 of the ribbon, the results will be two pieces generally similar to FIG. 3 and one piece with a generally uniform thickness. If the glass ribbon 402 is cut at any point between points W and X, the result will be two pieces that generally look like FIG. 4.

It is believed that the glass ribbon configuration discussed above and shown in FIGS. 6 and 7 can also be achieved by reducing the viscosity of the center portion of the ribbon as compared to the longitudinal edges, or increasing the viscosity of the longitudinal edge portions of the ribbon relative to the center portion, so that the difference between the downstream velocity of the longitudinal edge portions as compared the velocity of the ribbon at the lehr decreases. This reduction in differential will result in a wedge shaped thickness profile along the edges of the ribbon as discussed earlier. This type of condition can be realized by adding more heat to the float bath, and in particular to the center portion of the ribbon, and/or by cooling the longitudinal edges of the glass ribbon, e.g. by using coolers 50.

It should be appreciated that based on the teachings of the present invention, a glass ribbon having a profile as shown in FIG. 8 can also be produced, which in turn can be used to provide glass as shown in FIGS. 3 and 5. More particularly, wedge shaped portions 502 and 504 are formed along the longitudinal edge 506 and 508, respectively, of ribbon 510, with the thickness of these wedge shaped portions increasing from the edges towards the center of the ribbon. This can be accomplished by reducing the rotational speed of the rolls of the edge roll machines, thus reducing the speed at which longitudinal edge portions 52 of the ribbon 24 advance through the forming chamber 16, so that the difference between the downstream velocity of the ribbon 24 along its longitudinal edge portions 52 and the velocity at which the ribbon 24 exits the forming chamber 16 and enters the lehr 36 increases. This increased velocity differential causes the thickness of the ribbon in the longitudinal edge portions 52 to decrease because there will be an increase in glass attenuation in this localized area. The amount of increase in the ribbon attenuation and the accompanying decrease in glass ribbon thickness will be a function of the differential, i.e. the greater the velocity differential, the greater the ribbon attenuation and the greater the localized reduction in ribbon thickness. As one moves from edge 30, through the edge portion 52 toward the center portion 54 of the ribbon 24, the effect that the change in roll speed has on changing ribbon attenuation as compared to the center portion of the ribbon diminishes. More specifically, the velocity differential decreases and ribbon attenuation decrease until it is the same as the center portion of the ribbon. The increased attenuation along the edge of the ribbon and the gradual decrease in attenuation as one moves toward the center of the ribbon results in generally wedge shaped thickness profile in the longitudinal edge portions 52, with the edges 30 having the smallest thickness and the thickness increasing through the longitudinal edge portions 52 to the final uniform thickness of the center portion 54.

The resulting ribbon profile is shown in FIG. 8. It should be appreciated that if the glass ribbon 510 is cut at point Y, i.e. where wedge portion 502 meets uniform thickness center portion 512, the result will be a first piece of glass that generally looks like FIG. 3 and a second piece of glass that generally looks like FIG. 5. If the ribbon is cut at points Y and Z, wherein point Z is where wedge portion 504 meets uniform thickness center portion 512, the result will be two pieces of glass that generally look like FIG. 3 and one piece of glass that has a constant thickness. If the ribbon as shown in FIG. 8 is cut at any point between points Y and Z, the result will be two pieces of glass that generally resemble FIG. 5.

It is believed that the glass ribbon configuration discussed above and shown in FIG. 8 can also be achieved by increasing the viscosity of the center portion of the ribbon as compared to the longitudinal edges, or reducing the viscosity of the longitudinal edge portions of the ribbon relative to the center portion, so that the difference between the downstream velocity of the longitudinal edge portions as compared the velocity of the ribbon at the lehr increase. This increase in differential will result in a wedge shaped thickness profile along the edges of the ribbon as discussed above. In a manner similar to that discussed earlier, this type of condition can be realized by reducing the heat to the float bath, and in particular to the center portion of the ribbon, and/or by increasing the heat to the longitudinal edges of the glass ribbon, e.g. by eliminating or reducing the number of coolers 50.

Based on the above, in one nonlimiting embodiment of the present invention, the glass thickness is in the range of 0.0625 to 0.125 inches, i.e. the generally uniform thickness of the glass is in the range of 0.0625 to 0.125 inches and the thickness of the glass along the outer edge of its wedge shaped portion is in the range of 0.0625 to 0.125 inches.

It is contemplated that a laminate, for example an automotive windshield for a heads-up display system, can incorporate glass as disclosed herein to produce a windshield that reduces and possibly eliminates double imaging of the reflected image. For example, referring to FIGS. 9 and 10, windshield 602 includes a first glass ply 604 laminated to a second glass ply 606 by interlayer 608. In this nonlimiting embodiment of the invention, windshield 602 includes opposing arcuate edges 610 and 612. The interlayer material typically used in automotive windshields is polyvinylbutyral (PVB), although other materials can be used. In windshield 602 at least one of plies 604 and 606 has a thickness configuration as shown in FIG. 5. For example, and without limiting the present invention, glass ply 604 includes a first portion 614 that has a generally uniform thickness profile and a second portion 616 that has a generally wedge shaped profile, wherein the thickness of second portion 616 decreases as one moves from the intersection 618 between the first and second portions, towards the lower edge 620 of the glass ply. Depending on where the image from the display unit of a heads-up display system is to be projected on the windshield, the second portion 616 of glass ply 604, i.e. the wedge shaped portion, can extend over 10 to 90% of the height H of the windshield 602, for example 10 to 60%, or 20 to 50%.

It should be appreciated that if desired, both plies can have a wedge shaped portion. More specifically and referring FIG. 11, in one nonlimiting embodiment of the invention, windshield 702 includes glass plies 704 and 706, and interlayer 708. Ply 704 includes a first portion 710 having a uniform thickness and a second portion 712 having a wedge shaped thickness profile with a wedge angle C1. Ply 706 includes a first portion 714 having a uniform thickness and a second portion 716 having a wedge shaped thickness profile with a wedge angle C2. Wedge angle C1 can be greater than, equal to or less than wedge angle C2. Furthermore, the extent to which the wedge shaped second portion 712 covers the glass ply 704 can be the same, greater or less than the extent over which wedge shaped second portion 716 covers glass ply 706. The rate of change in the thickness in the second portions 712 and 716 in plies 704 and 706, respectively, can be uniform or nonuniform.

Without limiting the present invention, in one nonlimiting embodiment of a windshield of the present invention wedge angle D of the windshield, i.e. the angular difference between the outermost opposing surfaces of the windshield in the area of the wedge shaped glass, ranges from 0.01 to 0.04 degrees (0.17 to 0.70 milliradians), for example from 0.02 to 0.0344 degrees (0.35 to 0.60 milliradians), or from 0.0229 to 0.0287 degrees (0.4 to 0.5 milliradians). This wedge angle D for the laminate can be achieved by incorporating the entire angle into only one of the glass plies, for example as shown in FIG. 10, or by using two glass plies, each having a wedge shaped portion, for example as shown in FIG. 11. More particularly, referring to FIG. 10, the wedge angle D of windshield 602 is the angular difference between the outermost opposing surfaces 624 and 626 of the windshield in the area of the wedged portion 616 of first ply 604. Referring to FIG. 11, the wedge angle D of windshield 702 is the angular difference between the outermost opposing surface 718 of wedge portion 712 of first ply 704 and surface 720 of wedge portion 716 of second ply 706. The sum of the wedge angles C for each individual glass ply, i.e. wedge angles C1 and C2 as discussed above, will provide the total wedge angle D of the windshield 702. Although not required, a wedge shaped interlayer can be incorporated into these nonlimiting embodiments to contribute to the wedge angle of the windshield, as discussed in more detail below. Depending on the inclination of the interlayer, the wedge angle if the windshield can either increase or decrease.

Based on the above, in one nonlimiting embodiment of the present invention, the wedge angle of the glass ranges from 0.01 to 0.04 degrees (0.17 to 0.70 milliradians), for example 0.02 to 0.035 degrees (0.35 to 0.61 milliradians).

In one nonlimiting embodiment of the present invention, interlayer incorporated into the windshield can include a shade band. For example and without limiting the present invention, interlayer 608 in windshield 602 can include a shade band 622 positioned along the upper edge 610 of the windshield 602, where the thickness of the windshield 602 is greater than along the lower edge 612. The shade band 622 substantially parallels the arcuate edge 610 of windshield 602.

In another nonlimiting embodiment of the present invention, the interlayer of the windshield can also have a wedged configuration. More specifically, the interlayer can have a wedge shape over its entire cross-section. The following discussion is directed toward the use of a wedge shaped interlayer in a windshield of the type shown in FIGS. 9 and 10, but it should be appreciated that it can also be used in a windshield of the type shown in FIG. 11. This type of interlayer configuration is typical for interlayer that includes a shade band 622 and is stretched to provide an overall arcuate shape that generally corresponds to the arcuate shape of the glass plies 604 and 606 and allows the shade band 622 to substantially parallel the upper edge 610 of windshield 602. Equipment and processes uses to stretch interlayer in a manner that results in this wedge shaped thickness profile is well know in the art. Incorporating the interlayer into the windshield would result in the entire windshield having a wedged profile, with a first wedge angle in the first portion of the windshield where the first portion 614 of the first ply 604 is secured to the second ply 606 by the wedged interlayer 608, and a second wedge angle in the portion of the windshield where the second portion 616 of the first ply 604 is secured to second ply 606 by the wedged interlayer 608. In this nonlimiting embodiment, the first wedge angle would be equal to the wedge angle of the interlayer, while the second wedge angle would be equal to the wedge angle of the interlayer plus the wedge angle of portion 616. Although not required, in this configuration, the second wedge angle is typically greater than the first wedge angle. In another nonlimiting embodiment, the interlayer can have one or more portions having a generally uniform thickness profile and one or more portions having a varying wedge shaped thickness profile. In still another nonlimiting embodiment, the interlayer can have two or more portions each having a different wedge shaped thickness profiles. The desired configuration of the interlayer and the location of the uniform and wedged portions within the laminate will depend on the thickness configuration of the glass sheets and the location on the windshield where the image from the heads-up display is projected. As a result, in one nonlimiting embodiment of the invention, windshield 602 can have a first wedge portion with a first wedge angle and a second wedge portion with a second wedge angle different from the first wedge angle. It should be appreciated that if a wedge shaped interlayer of the type discussed above was incorporated into a windshield as shown in FIG. 11, the wedge angle D of the lower portion of windshield 702 would equal C1 plus C2 plus the wedge angle of the interlayer.

Although the above discussion has been directed to the use of glass plies with a wedge shaped portion being incorporated into a windshield, it should be understood that the glass can be incorporated into laminates including other types of materials, for example plastic plies, and/or laminates for other types of use. In addition the glass does not need to be part of a laminate can also be used as a monolithic sheet.

It will be appreciated by those skilled in the art that changes could be made to the embodiments described above without departing from the broad inventive concept thereof. It is understood, therefore, that this invention is not limited to the particular embodiments disclosed, but is intended to cover modifications which are within the spirit and scope of the invention, as defined by the appended claims.

What is claimed is:

1. A glass sheet comprising:
   a first major surface;
   an opposite second major surface;
   a first edge interconnecting the first and second major surfaces;
   an opposing second edge interconnecting the first and second major surfaces;
   a location between the first edge and second edge, wherein portion of the glass sheet between the location and the first edge is defined as a first portion, and portion of the glass sheet between the location and the second edge is defined as a second portion,
   wherein:
      the thickness of the first portion measured between the first and second major surfaces is a generally uniform thickness from the location to the first edge, and
      the thickness of the second portion measured between the first and second major surfaces has a varying thickness selected from the group of a continuously increasing thickness from the location to the second edge, and a continuously nonuniform decreasing thickness from the location to the second edge with at least one of the surfaces of the second portion having a curved surface.

2. The glass sheet as in claim 1, wherein the second portion has a continuously increasing thickness from the location to the second edge.

3. The glass sheet as in claim 1, wherein the second portion of the glass sheet has a wedge angle ranging from 0.01 to 0.04 degrees.

4. The glass sheet as in claim 3, wherein the second portion of the glass sheet has a wedge angle ranging from 0.02 to 0.035 degrees.

5. A laminated transparency, comprising:
   a first glass ply having a first edge, an opposing second edge, and a location between the first edge and second edge, wherein the first glass ply has a first portion extending between the first edge and the location and a second portion extending between the location and the second edge, and further wherein the first portion has a generally uniform thickness and the second portion is selected from the group of a continuously increasing thickness from the location to the second edge, and a continuously nonuniform decreasing thickness from the location to the second edge, of the first glass ply with at least one surface of the second portion having a curved surface;
   a second glass ply, and
   an interlayer material securing the first glass ply to the second glass ply.

6. The transparency as in claim 5, wherein a portion of the transparency where the second portion of the first ply is secured to the second ply has a wedge angle ranging from 0.01 to 0.04 degrees.

7. The transparency as in claim 6, wherein the portion of the transparency where the second portion of the first ply is secured to the second ply has a wedge angle ranging from 0.02 to 0.035 degrees.

8. The transparency as in claim 5, wherein the second glass ply has a first edge generally aligned with the first edge of the first ply, an opposing second edge generally aligned with the second edge of the first ply, and a location between the first edge and second edge of the second ply, and the second glass ply has a first portion extending between the first edge of the second ply and the location of the second ply and a second portion extending between the portion of the second ply and the second edge of the second ply, and further wherein the first portion of the second ply has a generally uniform thickness and the second portion of the second ply has a varying thickness from the location of the second ply to the second edge of the second glass ply.

9. The transparency as in claim 5, wherein the laminate is an automotive windshield.

10. The transparency as in claim 9, wherein at least a portion of the interlayer material includes a wedge shaped thickness profile.

11. The transparency as in claim 9, wherein the windshield has arcuate, opposing upper and lower edges, and the interlayer material includes a shade band that substantially parallels the upper arcuate edge of the windshield.

12. The glass sheet as in claim 1 wherein the second portion has the continuously nonuniform decreasing thickness from the location to the second edge with at least one of the surfaces of the second portion having a curved surface.

13. The glass sheet as in claim 2 wherein the continuously increasing thickness of the second portion is a continuously uniform increasing thickness from the location to second edge with at least one of the surfaces of the second portion lying along a generally straight line.

14. The glass sheet as in claim 2 wherein the continuously increasing thickness of the second portion is a continuously nonuniform increasing thickness from the location to the second edge.

15. The glass sheet as in claim 14 wherein at least one of the surfaces of the second portion has a curved surface.

16. The glass sheet as in claim 12 wherein the curved surface is a concave curved surface.

17. The glass sheet as in claim 12 wherein the curved surface is a convex curved surface.

18. A laminated transparency, comprising:
a first transparent sheet having a first surface and an opposite second surface;
a second transparent sheet having a first surface and an opposite second surface;
an interlayer material securing the second surface of the first sheet to the first surface of the second sheet to provide a laminated transparency having the first surface of the first sheet as first outer surface of the transparency and the second surface of the second sheet as opposite second outer surface of the transparency, wherein
the transparency comprises a first edge, an opposing second edge, and a location between the first edge and second edge, wherein the transparency has a first portion extending between the first edge and the location and a second portion extending between the location and the second edge; the first portion has a generally uniform thickness as measured between the first and second outer surfaces of the laminated transparency, and the second portion is selected from the group of a continuously increasing thickness as measured between the first and second outer surfaces of the transparency from the location to the second edge, and a continuously nonuniform decreasing thickness as measured between the first and second outer surfaces of the transparency from the location to the second edge of the laminated transparency with at least one of the outer surfaces of the second portion of the laminated transparency having a curved surface.

19. The glass sheet of claim 1 wherein the distance between the location and the first edge is a fixed first distance and the distance between the location and the second edge is a fixed second distance.

20. The glass sheet of claim 1 wherein the glass sheet was a portion of an annealed float glass ribbon.

* * * * *